(12) United States Patent
Schuetzle et al.

(10) Patent No.: US 12,377,394 B2
(45) Date of Patent: *Aug. 5, 2025

(54) CATALYTIC REACTOR FOR THE CONVERSION OF CARBON DIOXIDE AND HYDROGEN TO SYNGAS

(71) Applicant: Infinium Technology, LLC, Sacramento, CA (US)

(72) Inventors: Dennis Schuetzle, Grass Valley, CA (US); Robert Schuetzle, Sacramento, CA (US); Anja Rumplecker Galloway, San Rafael, CA (US); Orion Hanbury, Sacramento, CA (US); James Bucher, Boston, MA (US); Ramer Rodriguez, Sacramento, CA (US)

(73) Assignee: Infinium Technology, LLC, Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/445,557

(22) Filed: Oct. 12, 2023

(65) Prior Publication Data

US 2024/0058778 A1 Feb. 22, 2024

Related U.S. Application Data

(63) Continuation of application No. 17/300,828, filed on Nov. 19, 2021, now Pat. No. 11,819,815.

(51) Int. Cl.
*B01J 8/00* (2006.01)
*B01J 8/02* (2006.01)
(Continued)

(52) U.S. Cl.
CPC .............. *B01J 8/004* (2013.01); *B01J 8/008* (2013.01); *B01J 8/0285* (2013.01); *C01B 3/06* (2013.01);
(Continued)

(58) Field of Classification Search
CPC ... B01J 8/00; B01J 8/0015; B01J 8/004; B01J 8/008; B01J 8/02; B01J 8/0242;
(Continued)

(56) References Cited

U.S. PATENT DOCUMENTS

| 5,668,922 A * | 9/1997 | Ross .................. B29C 66/54 |
| | | 392/441 |
| 11,819,815 B2 * | 11/2023 | Schuetzle ............... C01B 32/40 |
| 2021/0051770 A1 * | 2/2021 | Appel ....................... C01B 3/30 |

FOREIGN PATENT DOCUMENTS

WO WO-2019145279 A1 * 8/2019 ............... B01J 8/24

* cited by examiner

*Primary Examiner* — Natasha E Young
(74) *Attorney, Agent, or Firm* — McKinney Law Group APC; Jeffrey A. McKinney

(57) ABSTRACT

The present invention is generally directed to a reactor for the production of low-carbon syngas from captured carbon dioxide and renewable hydrogen. The hydrogen is generated from water using an electrolyzer powered by renewable electricity or from any other method of low-carbon hydrogen production. The improved catalytic reactor is energy efficient and robust when operating at temperatures up to 1800° F. Carbon dioxide conversion efficiencies are greater than 75% with carbon monoxide selectivity of greater than 98%. The catalytic reactor is constructed of materials that are physically and chemically robust up to 1800° F. As a result, these materials are not reactive with the mixture of hydrogen and carbon dioxide or the carbon monoxide and steam products.

8 Claims, 3 Drawing Sheets

(51) Int. Cl.
  *C01B 3/06*    (2006.01)
  *C01B 5/00*    (2006.01)
  *C01B 32/40*   (2017.01)
  *C01B 32/50*   (2017.01)
(52) U.S. Cl.
  CPC ............... *C01B 5/00* (2013.01); *C01B 32/40* (2017.08); *C01B 32/50* (2017.08)
(58) Field of Classification Search
  CPC ...... B01J 8/025; B01J 8/0285; B01J 2208/00; B01J 2208/00008; B01J 2208/00017; B01J 2208/00389; B01J 2208/00398; B01J 2208/00415; B01J 2208/00477; B01J 2208/00495; C01B 3/00; C01B 3/02; C01B 3/06; C01B 3/12; C01B 3/16; C01B 5/00; C01B 32/00; C01B 32/40; C01B 32/50; C01B 2203/00; C01B 2203/08; C01B 2203/0805; C01B 2203/0811; C01B 2203/085; C01B 2203/0866; C25B 1/00; C25B 1/01; C25B 1/02; C25B 1/04; C25B 15/00; C25B 15/08; C25B 15/081
  See application file for complete search history.

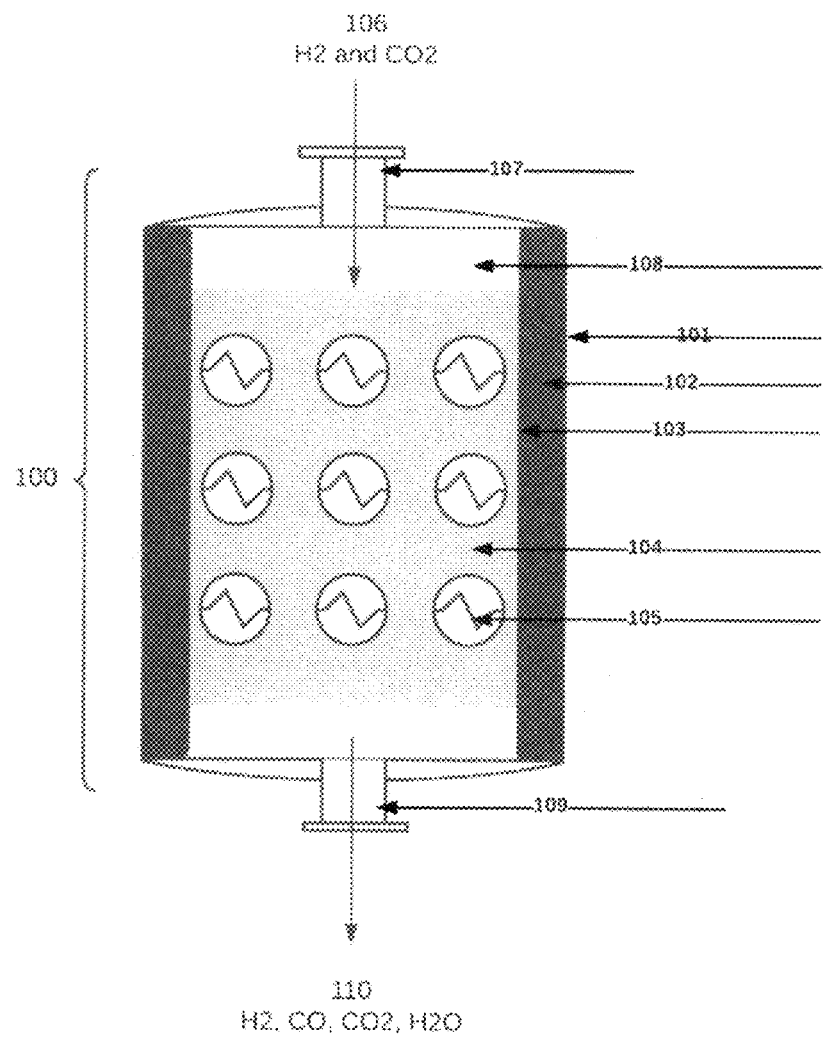
Fig. 1 – Improved Catalytic Reactor

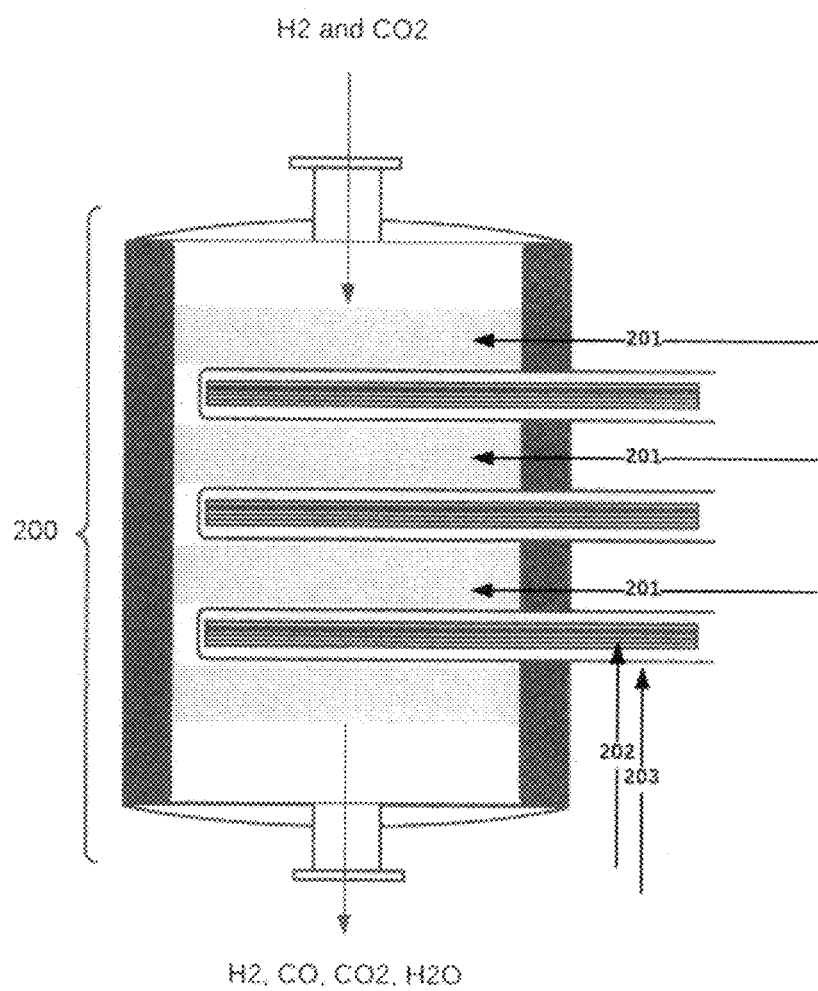
Fig. 2 – Embodiment of Improved Catalytic Reactor

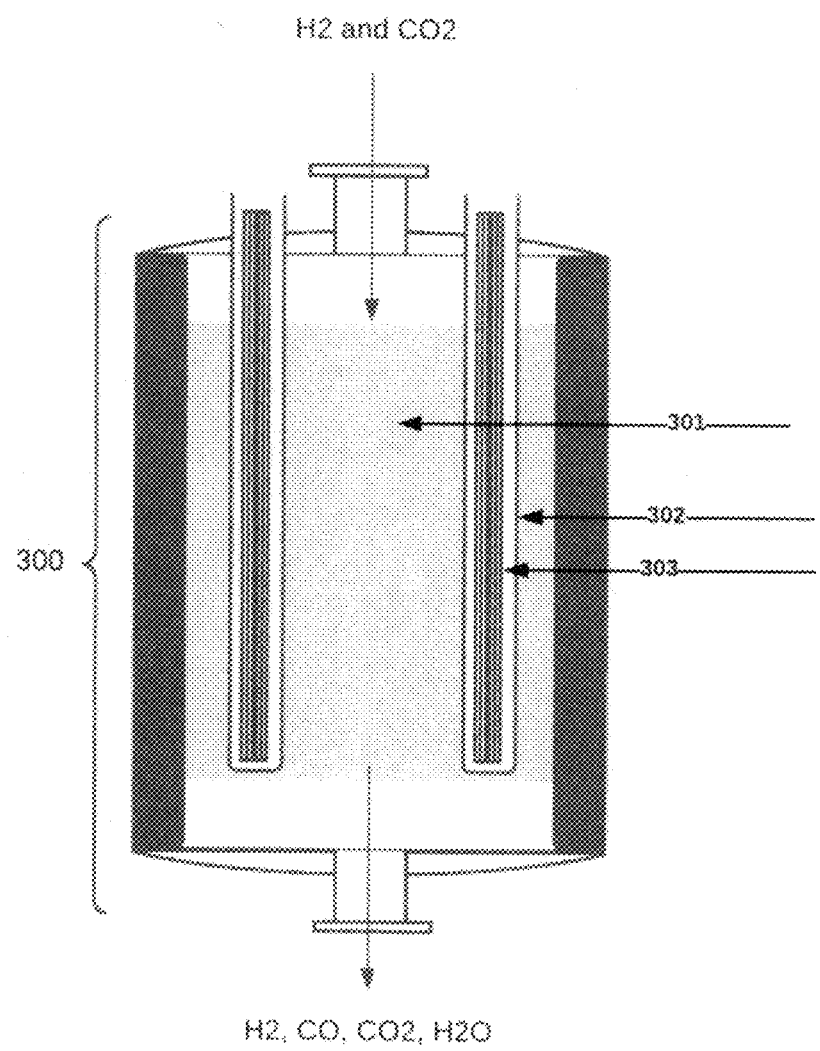
Fig. 3 – Embodiment of Improved Catalytic Reactor

CATALYTIC REACTOR FOR THE CONVERSION OF CARBON DIOXIDE AND HYDROGEN TO SYNGAS

This application is a continuation of U.S. patent application Ser. No. 17/300,828, now 11,819,815, filed on Nov. 19, 2021, which is hereby incorporated by reference into this document.

FIELD OF THE INVENTION

The present invention relates to an improved catalytic reactor for carrying out endothermic reactions, in particular for the efficient conversion of carbon dioxide and hydrogen to syngas. Stable and safe operation of the improved catalytic reactor can be maintained over extended periods at a wide range of operating conditions, exceeding 75% conversion efficiency in some cases. The catalytic reactor is constructed of materials that are physically and chemically robust up to a temperature of 1800° F. and are not reactive with the hydrogen and carbon dioxide reactants or the carbon monoxide and steam products. Separate hydrogen and carbon dioxide streams are compressed, heated to the desired temperatures, mixed in the proper volumetric proportions, and delivered into the improved catalytic reactor. In a separate embodiment, hydrogen and carbon dioxide are heated together before introduction to the catalytic reactor. With the objective of minimizing emissions, the integrated reactor heaters may utilize both natural gas and electricity. The reactor design integrates heating with the catalyst bed to provide thermal energy for the endothermic reaction. Alternatively, the gases may be heated before entering the bed and do not use integrated heating in order to achieve the desired results.

BACKGROUND OF THE INVENTION

The negative consequences on climate and ecological environments due to greenhouse gas emissions have become increasingly problematic and have made apparent what climate scientists have long predicted. Global average temperatures have increased by more than 1° C. since pre-industrial times, with warming exceeding 5° C. in some areas (Schuetzle, 2020; Rohde, 2021). To slow down and eventually halt rising global temperatures, the emissions of carbon dioxide and other greenhouse gases need to be drastically reduced and eventually brought to net-zero. Carbon capture and utilization technologies, as well as a significant reduction of carbon dioxide emissions, are crucial elements to meeting the Paris Agreement objectives to keep global warming below 2° C. (Gutierrez et al, 2021).

Carbon capture and storage (CCS) will play a fundamental role in achieving these goals. Most ongoing CCS projects inject carbon dioxide into sedimentary basins and require impermeable rock to prevent the carbon dioxide from migrating back to the surface. Direct air capture (DAC) is a technology that captures carbon dioxide directly from the air with an engineered mechanical system. Technologies for capture of carbon dioxide from the atmosphere have been contemplated for a while and several small-scale pilot plants are in operation (Spector and Dodge, 1946). The plant designs usually incorporate the use of fans and a filtration system by which the carbon dioxide is selectively removed. The captured carbon dioxide is then released, and the filtration system regenerated. Permanent storage of recovered carbon dioxide may be accomplished through mineral carbonation. Although in-situ mineralization is a promising tool for permanent carbon storage, its large-scale implementation remains little explored beyond pilot or field-based experiments.

Carbon dioxide should be regarded as a valuable carbon feedstock for sustainable manufacturing of liquid fuels and chemicals. The importance of carbon dioxide utilization in carbon management has long been recognized, and carbon dioxide is projected to play an essential role as the future raw material in the post-fossil fuels era (Hepburn et al, 2019). Alden and co-workers have recently predicted carbon dioxide utilization (CDU) potential for carbon dioxide into chemicals to be around 0.3-0.6 GT $CO_2$/yr in 2050 and rationalized that carbon dioxide to fuel has the highest estimated potential for CDU in the range of 1-4.2 GT $CO_2$/yr. The reverse water gas shift (RWGS) has been proposed and marketed as a potential solution that may achieve decarbonization at the scale of multi-GT $CO_2$/yr (Artz et al, 2018).

Carbon dioxide hydrogenation (CO2H), which includes the reverse water-gas shift (RWGS) reaction, is a technology that converts carbon dioxide to other carbonaceous species such as carbon monoxide, a crucial precursor to produce liquid fuels such as diesel and gasoline, as well as chemicals.

The CO2H and RWGS reaction approach has the advantage of high reaction rates, good selectivity, and immediate technological readiness but requires renewable hydrogen generation to minimize its carbon footprint. Currently, most hydrogen is produced from fossil fuels by steam reforming of natural gas or gasification of coal depending on the desired hydrogen to carbon monoxide ratio. While this is an important near-term path for hydrogen production, efforts need to be taken to reduce carbon dioxide emissions. Combining natural gas reforming with carbon capture, utilization, and storage is one step towards lower emissions. Biomass can also be converted to hydrogen through various methods. Because biomass removes carbon dioxide from the atmosphere, the net carbon emissions can be low in combination with CCS. Electricity is also used to produce hydrogen. Because electricity can come from a variety of renewable sources such as solar, wind, or geothermal, it is a promising option for carbon-free production of hydrogen.

The RWGS reaction is a favorable method of sustainable syngas production, especially when hydrogen is produced from renewable sources such as wind or solar energy. A significant amount of work has been carried out towards the development of an industrial RWGS process, including efficient catalytic systems, reactor units, and even pilot scale processes. However, there has still been a lack of progress in the implementation of RWGS at an industrial scale. One key challenge is the material selection of the reactor, piping, analytical equipment, and instrumentation. The handling of carbonaceous gas mixtures remains a challenge at high temperatures and pressures. Another concern is the management of heat in the RWGS reactor to achieve safe and stable operation at high conversion over extended periods of time.

The RWGS reaction (Eq. 1) is the reversible hydrogenation of carbon dioxide to produce carbon monoxide and steam. Since carbon dioxide is a relatively unreactive molecule, the conversion of carbon dioxide to carbon monoxide is endothermic; it is energy intensive and favored at high temperatures. At low temperatures methanation, also known as the Sabatier reaction, is favored over the RWGS reaction (Eq. 2).

$$CO_2 + H_2 \rightleftharpoons CO + H_2O \quad \Delta H°_{298k} = +41 \text{ kJ mol}^{-1} \qquad \text{Eq. 1}$$

$$CO_2 + 4H_2 \rightleftharpoons CH_4 + 2H_2O \quad \Delta H°_{298k} = -165 \text{ kJ mol}^{-1} \qquad \text{Eq. 2}$$

Since the RWGS reaction is endothermic, it requires high temperature and is heat transfer limited. Therefore, the optimization of heat transfer characteristics and residence time are especially crucial in the catalytic reactor.

Although much work has been carried out towards the development of CO2H or RWGS catalytic reactors, there is still a lack of understanding of the optimal reactor geometry, heat management, and material selection. For an industrial RWGS reactor to be commercially viable, it needs to meet the following design and operational requirements:

1. The use of catalytic reactor materials that are physically and chemically robust up to 1800° F.
2. The materials used for the catalytic reactor walls and instrumentation do not react adversely with hydrogen, carbon dioxide, carbon monoxide, and steam.
3. An energy efficient catalytic reactor heating system that utilizes renewable or low carbon power.
4. A catalytic reactor and associated piping that minimizes carbon formation.
5. A linear drop in carbon dioxide conversion less than 1.0%/50° F. between 1250 and 1750° F.
6. A carbon dioxide conversion exceeding 75% per pass above 1250° F.
7. A carbon monoxide selectivity exceeding 98%.

Commercial reactors used for high temperature reactions are typically constructed with either a precast refractory or stainless steel. Their geometry is usually a cylindrical metal shell with a thick refractory layer as well as an internal metal liner. A refractory lining normally comprises a safety or backup layer behind the working lining in contact with the furnace contents. Due to different heat expansion coefficients, the temperature gradients in the system and the properties of all materials must be carefully considered. Expansion of refractories should not cause excess stress leading to lining failure by cracking of the reactor shell. While this is of course a safety consideration, it also greatly affects the reactor lifetime.

A common type of industrial catalytic reactor is for the endothermic steam reforming of methane or other hydrocarbons. These endothermic steam reforming reactors consist of high-temperature steel tubes filled with catalyst. The catalytic reactor is typically heated externally using gas burners or electric heaters. The difficulty with this design is that heating of the reactor and the tubes is not homogeneous. This often leads to reduction in the lifetime of the reactor shell and tubes. In regions of the reactor where the temperature is lower than operational specifications, conversion efficiencies are reduced, and carbon deposition can occur. In areas where the temperature is higher than specified, metals may lose their shape and catalysts can sinter, melt, and lose surface area (Eigenberger et al, 2012). Metal dusting, whereby the metal carburizes and decomposes, is a specific type of corrosion that can occur in reforming reactors when the operating temperature exceeds the design temperature.

The coupling of endothermic catalytic reactors in series is well known in the current art. Typically, one long endothermic reactor is divided into three smaller reactors. Reheating the process stream between reactors returns the process stream to the temperature needed for efficient conversion of reactants and the suppression of undesirable secondary reactions. For example, in a three catalytic reactor system, the reactors are typically progressively longer. Usually, the first catalyst bed is shorter than the following reactor since heat is quickly lost by the process stream and undesirable reactions may occur, and therefore the stream needs to be reheated to maintain efficiency (Process Technology and Operator Academy, 2015). Multiple reactor systems have the disadvantage of additional piping and high capital costs.

The integration of endothermic catalytic reactors with exothermic catalytic reactors has been proposed to reduce energy use. However, in most cases, such integrations are not practical and often costly (Rahimpour et al, 2012). The integration of waste heat with endothermic reactions is often a more economical means of syngas production. Maass et al. (2021) disclosed a two-zone reactor in which coke oven gas is used to convert hydrogen and carbon dioxide to carbon monoxide and steam in the first zone, and the product steam subsequently reforms hydrocarbons present in the coke oven gas in the second zone to generate syngas. Such methods require the initial input of heat from an upstream source such as a coke oven, requiring that syngas production be coupled with existing industrial processes.

The use of a product stream of reformed gas as a source of heat in heat exchange reforming is known in the art. Fuderer (1984) described an endothermic catalytic reactor in which a hydrocarbon feed is introduced in parallel to a tubular reformer and heat exchange reformer. The partially reformed gas from the tubular reformer is then used as a heat source for the reforming reactions in the heat exchange reformer.

Some prior studies revealed that at high temperatures the metallurgy of the reactor may impact the performance of the catalyst and advised screening of catalysts to be performed solely in quartz reactors. Bustamante et al. (2004) found that carbon dioxide conversion was two orders of magnitude greater in an Inconel reactor compared to a quartz reactor due to the catalyzing effect of the nickel in Inconel 600.

However, no study has been carried out to develop an optimal metallurgy or refractory that specifically address the challenges of an endothermic reactor which operates at high temperatures, at high pressures, and in a highly reducing environment. No prior study has investigated the use of specific materials and reactor concepts over extended periods of time.

Metal dusting is a carburization that occurs when carbonaceous gases pass over catalytic metallic surfaces. Initially the formation of powdery coke can hinder gas flow, requiring higher pressure and temperature gradients. This is particularly important in industrial heat exchangers. The phenomena can lead to formation of metal particles on the material surface, material disintegration, and eventually even to catastrophic failure, which is why appropriate material selection is a particular challenge in RWGS.

The following reactions can lead to the formation of carbon at the metal surface:

$$CO + H_2 \rightleftharpoons C + H_2O \qquad \text{Eq. 3}$$

$$2CO \rightleftharpoons C + CO_2 \qquad \text{Eq. 4}$$

$$C_xH_y \rightleftharpoons y/2\ H_2 + xC \qquad \text{Eq. 5}$$

Grabke et al. (1975) and Shatynski et al. (1978) demonstrated that among the mentioned reactions, Eq. 3 shows the fastest kinetics that results in extreme metal dusting at elevated temperatures in a CO—$H_2$ environment. Eq. 4 is known as the Boudouard reaction and is assumed to play a lesser role due to its slower kinetics.

Carbon formation also occurs due to the solid-state reaction involving metal carbide dissolution. For iron and steel alloys, Hochman (1977) and Grabke (1999) proposed that carbon formed from metal dusting was caused by the diffusion of CO into the metal to form cementite $M_3C$ (M=Fe, Ni). Cementite in part could then resist further penetration. Yet, as a result, high carbon activity at the metal surface causes coke to nucleate locally. Due to the then reduced carbon activity, the stability of $Fe_3C$ and $Ni_3C$ is reduced causing it to decompose. Carbon and metal diffuse to the metal surface to form additional coke and metal particles on the surface. The metal nanoparticles on the surface then act as a catalyst to further accelerate the process and material disintegration. Another problematic material corrosion mechanism relevant for RWGS process material selection is a form of internal oxidation of chrome-nickel-iron alloys causing embrittlement. The term has been coined for because the fractured surfaces have a green appearance due to formation of $Cr_2O_3$ for various alloys. The fresh fracture surface exhibits a greenish tint caused by the internal oxide precipitates that caused the embrittlement, which has coined the term "green rot".

BRIEF SUMMARY OF THE INVENTION

This invention describes the design of an improved commercial-scale catalytic reactor for the efficient conversion of carbon dioxide and hydrogen mixtures to syngas. It also proposes a novel material selection and assembly that can be employed in commercial-scale reactors, heat-exchangers, and analytical equipment to maximize performance and equipment lifetime.

BRIEF DESCRIPTION OF THE DRAWINGS

FIG. 1 shows the improved catalytic reactor 100. The reactor consists of an outer shell 101 capable of withstanding the maximum desired operating pressure; a refractory layer 102 directly inside the metal shell that is chemically unreactive with carbon monoxide, carbon dioxide, hydrogen, and steam at high temperatures and pressures; an inner sleeve 103 made of high-temperature alloy and/or aluminia; a catalyst bed 104; and electrical resistive heating elements 105 integrated into the catalyst bed. Inductive or other types of electrical heating methods may also be used. The reactant gas blend of hydrogen and carbon dioxide 106 is fed into the catalytic reactor 100 and maintained at a temperature between 1200° F. and 1700° F. and a pressure between 0 and 500 psig through the reactor. The reactant gas mixture is converted to syngas (hydrogen and carbon monoxide) and water with unreacted carbon dioxide.

FIG. 2 depicts an embodiment of the catalytic reactor shown in FIG. 1 in which the catalyst bed is divided into multiple short sections 201 with sheathed electrical resistive heating elements 202 between each section.

FIG. 3 depicts an embodiment of the catalytic reactor shown in FIG. 1 in which the heating elements 301 are integrated into the catalyst bed 302 vertically. Inductive or other forms of electrical heating may also be used.

DETAILED DESCRIPTION OF THE INVENTION

The construction of the catalytic reactor 100 is depicted in FIG. 1. The reactor length and width depend on the desired syngas output and width may range from one to ten feet or more and length may range from one to forty feet or more. The outer shell 101 is constructed of metal capable of operating at differential pressures up to or greater than 500 psi, including but not limited to carbon steel, stainless steel, and titanium. The outer shell defines the shape of the reactor and may be of any geometry known in the art for catalytic reactors. The thickness of the outer shell is determined by the maximum desired operating pressure of the reactor and may range from % inch to 10 inches. It is protected from the corrosive and high temperature internal reactor environment by the refractory layer 102. This layer insulates the reactor so that the outer shell does not exceed a surface temperature of 600° F., more preferably a surface temperature that did not exceed 400° F., or even more preferably a surface temperature not to exceed 200° F. The refractory can be made from any insulating material and consists of a material including but not limited to alumina, calcium aluminate, magnesium aluminate, silicon carbide, and silicon nitride.

The refractory material is unreactive with carbon monoxide, carbon dioxide, hydrogen, and steam at the operating conditions. In some embodiments, the refractory contains catalytically active material. In some embodiments, the refractory layer consists of a single layer or multiple sublayers that consist of the same type or different types of material. This layer may be directly cast into the reactor using a castable refractory or may consist of refractory bricks bonded with cement. The total thickness of the refractory layer may vary from six to eighteen inches.

An inner sleeve 103 may be installed in applications where refractory is at risk to form crack. The inner sleeve consists of a high-temperature alloy including but not limited to alloys listed in Table 1. The inner sleeve may also consist of aluminia. The high-temperature alloys comprise material with weight percent of nickel between 29 and 75 wt % and with a weight percent of chromium between 13 and 32 wt %. The inner sleeve material can withstand a maximum temperature of 1800° F. and is unreactive with carbon monoxide, carbon dioxide, hydrogen, and steam at the reaction conditions. Some of the materials listed may require a passivation to minimize the risk of green rot formation or metal dusting. In some embodiments, the passivation consists of the formation of an oxide layer to lower the chemical potential for green rot formation and metal dusting. In some embodiments, the passivation layer or coating may consist of the formation of a stable oxide under the reaction conditions. The passivation layer comprises a metal oxide chosen from the group comprising iron oxide, or nickel oxide, or chromium oxide, or cobalt oxide, or molybdenum oxide, or tungsten oxide, or copper oxide, or niobium oxide, or calcium oxide, or magnesium oxide, or alumina, or titania. The passivation layer may contain physical mixtures as well as mixed oxide of the above-mentioned components.

Depending on the type of equipment, the passivation may be established during material construction or during start-up of the commercial plant prior to exposure to $CO_2$ and $H_2$. The chemical stability of the alloy used in the application may also be increased by creating a nitride passivation layer. The thickness of the passivation layer may vary from a thin passivation of few microns or deeper into the bulk phase. The thickness and choice of passivation may be chosen according to optimized heat transfer, or insulative properties, material strength, as well as chemical resistance.

TABLE 1

Reactor Alloy Formulations

| Alloy | Fe | Ni | Cr | Co | Mo | Mn | W | Cu | Nb | C | Si | Al | Ti |
|---|---|---|---|---|---|---|---|---|---|---|---|---|---|
| Haynes 214 | ≤3 | 75 | 16 | ≤2.0 | ≤0.5 | ≤0.2 | ≤0.5 | | | 0.04 | ≤0.2 | 4.5 | ≤0.5 |
| Haynes 230 | ≤3 | 57 | 22 | ≤5.0 | 2 | 0.5 | 14 | ≤0.5 | | 0.1 | 0.4 | 0.3 | ≤0.1 |
| Haynes 233 | ≤1.5 | 48 | 19 | 19 | 7.5 | ≤0.4 | ≤0.3 | | | 0.1 | ≤0.2 | 3.3 | 0.5 |
| Haynes HR-160 | ≤2.0 | 37 | 28 | 29 | ≤1.0 | 0.5 | ≤1.0 | ≤0.5 | | 0.05 | 2.75 | ≤0.4 | 0.5 |
| Haynes HR-235 | ≤1.5 | 60 | 31 | | 5.6 | ≤0.65 | | 3.8 | | ≤0.06 | ≤0.5 | ≤0.4 | ≤0.5 |
| Hastelloy X | 18 | 47 | 22 | 1.5 | 9 | ≤1.0 | 0.6 | ≤0.5 | | 0.1 | ≤1.0 | ≤0.5 | ≤0.15 |
| Incoloy 800HT | ≥39.5 | 30.0-35.0 | 19.0-23.0 | | | | | | | 0.06-0.1 | | 0.25-0.6 | 0.25-0.6 |
| Inconel 625 | 5 | 58 | 20.0-23.0 | | 8.0-10.0 | 0.5 | | | 3.15-4.15 | | | 0.4 | 0.4 |
| Inconel 600 | 6.0-10.0 | 72 | 14-17 | | | 1 | | 0.5 | | | | | |

In FIG. 1, the reactant gas blend comprising hydrogen and carbon dioxide 106 is introduced into the reactor through the inlet nozzle 107 at a temperature between 1250 and 1750° F. and a pressure between 0 and 500 psig. The entrance portion 108 of the reactor is empty to allow the flow of the reactant gases to develop fully before contacting the catalyst bed 104. The blend of hydrogen and carbon dioxide begins reacting once it contacts the catalyst bed, generating carbon monoxide and steam. The temperature of the gases decreases as the endothermic reaction proceeds, but the lost heat is restored to the gas mixture by heaters 105 that are integrated with the catalyst bed. The heaters are protected by a layer of high-temperature alloy like that which comprises the inner sleeve 103 so that the process gas mixture does not directly contact the elements. Alternatively, the heaters may be housed in refractory material. The reactant gas blend undergoes conversion to syngas along the reactor until it reaches the exit nozzle 109. The total conversion of carbon dioxide at the reactor exit is at least 75%, and the exit gas mixture 110 is no more than 100° F. less in temperature than the entrance gas mixture 106.

In some embodiments, the heaters 105 consist of resistive electrical heating elements, fuel fired burners, or a combination of the two. The fuel to the fired burners can comprise natural gas, hydrogen, combinations thereof or any other suitable fuel. Electrical heating elements are powered by carbon-free or low-carbon electricity sources such as wind, solar, geothermal, or nuclear. Where natural gas heaters are used, they are integrated in such a manner to minimize the combustion of natural gas or other fuel and the emission of carbon dioxide. A combination of electric and gas heaters into the catalytic bed of a single reactor will allow for better optimization of carbon dioxide emissions. Electric heat can be used to bring the catalyst bed to temperatures of 1000 to 1200° F., thereby decreasing the amount of natural gas needed to heat the bed to a final temperature of 1600 to 1800° F.

In one embodiment of the improved catalytic reactor (FIG. 2), the catalyst bed is divided into multiple short sections 201 with electrical resistive heating elements 202 between each section. The reactant gas blend of hydrogen and carbon monoxide is introduced into the reactor at a temperature between 1250 and 1750° F. and a pressure between 0 and 500 psig. The gases contact the first catalyst section and undergo the endothermic RWGS reaction, decreasing in temperature by no more than 100° F. along the section. A high-temperature alloy sheath 203 horizontally penetrates the outer shell and houses one of the resistive electrical heating elements 202. The sheath is positioned between the first and second catalyst sections and restores the gases to their original temperature. The power to the resistive heating element may be controlled based on the temperature of the gases exiting the first catalyst section. The process gases alternately flow through the remaining catalyst sections and around the heating elements until the desired conversion of carbon dioxide is achieved. The number of catalyst sections may vary from 2 to 100. In another embodiment of the improved catalytic reactor, multiple sheaths housing resistive heating elements penetrate the reactor around its perimeter at each heating section, terminating in the center of the reactor. The number of heating elements per section may vary from 1 to 10 or higher.

In yet another embodiment of the improved catalytic reactor (FIG. 3), the reactor has a single catalyst bed 301 with sheaths 302 housing resistive or other types of electrical heating elements 303 penetrating the reactor vertically and traversing the entire length of the catalyst bed. The sheaths and elements may enter the reactor through the top, bottom, or both; the number of sheaths and elements may vary from 1 to 10 or more. The heating elements 303 provide evenly distributed heat to the catalyst and process gases to maintain a relatively constant temperature along the reactor, allowing it to operate in a pseudo-isothermal manner.

Example 1: A stream comprising carbon dioxide and other waste gases is produced by an industrial process or captured from ambient air. This stream is fed to a carbon dioxide capture facility. The carbon dioxide capture facility uses an adsorbent such as methyl diethanolamine (MDEA) to capture the carbon dioxide. Relatively pure carbon dioxide is regenerated from the adsorbent by heating.

Low-carbon electricity from a wind farm, a solar farm, a nuclear power plant, or other low-carbon power sources is available at the site of the carbon capture facility. High-purity water is produced from locally available water. Low-carbon hydrogen is produced from the purified water via electrolysis.

Electrolysis uses the low-carbon electricity to split the water into hydrogen and oxygen gases. The electrolyzer in this example is a proton exchange membrane (PEM) electrolyzer. The electrolyzer produces hydrogen and oxygen at 300 psig each.

The pressurized hydrogen is electrically heated to 1650° F. and mixed with carbon dioxide that has also been compressed to 300 psig and electrically heated to 1650° F. The hydrogen and carbon dioxide are blended at a volumetric ratio of 3.4/1.0 and the flow rate of this mixture is adjusted to provide a gas space velocity of about 15,000 $hr^{-1}$ in the catalytic reactor. Since the catalytic reaction is endothermic, the temperature of the mixture decreases as the reactant gases are converted to syngas over the catalyst bed. The heating elements are arranged vertically in this example so that the temperature of the reactant gases does not drop more than 50° F. from the inlet at any point within the reactor. The total conversion of carbon dioxide in this example is 85% with a CO selectivity of 99%. After water has been removed from the product stream, the volumetric composition of the dry gas from the catalytic reactor is 72% $H_2$, 24% CO, and 4% $CO_2$.

Example 2: A gas blend with a volumetric carbon dioxide to hydrogen ratio of 3.0/1.0 is introduced into the catalytic reactor at a temperature of 1400° F. and a pressure of 100 psig. The gases flow over the catalytic bed and are reheated by the integrated electrical heating elements as in Example 1. The conversion of $CO_2$ at the reactor exit is 75% with 99% CO selectivity. After water has been removed from the product stream, the volumetric composition of the dry syngas is 73% $H_2$, 21% CO, and 6% $CO_2$.

REFERENCES

| U.S. Patents | | |
|---|---|---|
| 4,337,170 A1 | July 1982 | Fuderer |
| 7,718,832 B1 | May 2010 | Schuetzle et al. |
| 11,078,077 | August 2021 | Maass et al. |

| U.S. Patent Applications | | |
|---|---|---|
| 2003/0113244 A1 | June 2003 | DuPont et al |

NON-PATENT LITERATURE DOCUMENTS

Artz, J., Müller, T. E., Thenert, K., Kleinekorte, J., Meys, R., Sternberg, A., Bardow, A, Leitner, W: Sustainable conversion of carbon dioxide: An integrated review of catalysis and life cycle assessment. Chemical Reviews, 118, 434-504 (2018).

Bustamante, F. et al: High-temperature kinetics of the homogeneous reverse water-gas shift reaction, American Institute of Chemical Engineers, AIChE J, 50, 1028-1041 (2004).

Eigenberger, G., Ruppel, W.: Catalytic fixed-bed reactors, reaction engineering (part 10), Wiley Online Library, Hoboken, New Jersey (2012).

Field, C. B.; Mach, K. J.: Rightsizing carbon dioxide removal, Science 356, 706-707 (2017).

Hepburn, C.; Adlen, E.; Beddington, J.; Carter, E. A.; Fuss, S.; Mac Dowell, N.; Minx, J. C.; Smith, P.; Williams, C. K.: The technological and economic prospects for $CO_2$ utilization and removal, Nature, 575 (7781), 87-97 (2019).

Gutierrez J. M. et al: Climate Change 2021: The Physical Science Basis. Intergovernmental Panel on Climate Change (IPCC): Sixth Assessment Report (AR6), Aug. 9, 2021 (www.ipcc.ch/assessment-report/ar6).

Mac Dowell, N.; Fennell, P. S.; Shah, N.: Maitland, G. C. The role of $CO_2$ capture and utilization in mitigating climate change. Nat. Climate Change, 7 (4), 243-249 (2017).

Process Technology and Operator Academy, Endothermic vs. Exothermic Reactors (2015) (www.processtechacademy.com).

Ranjbar, A.; Aghamiri, S. F. Irankhah, A.: Effect of MgAl2O4 catalyst support synthesis method on the catalytic activity of nickel nano catalyst in reverse water gas sift reaction, Iranian Journal of Chemical Engineering, 16, 3 (2019).

Rahimpour, M. R., Dehnavi, M. R., Allahgholipour, F., Iranshahi, D., Jokar, S. M.: Assessment and comparison of different catalytic coupling exothermic and endothermic reactions: a review, Applied Energy, 99, 496-512 (2012).

Rohde, R., Global Temperature Report for 2020, Berkeley Earth (2021).

Schuetzle, D.: Historical and predicted global climate changes and some potential accelerated climate moderation approaches, Global Climate Action Summit, San Francisco, CA, 1-42 (2020) (www.researchgate.net).

Shukla, P. R. et al: Climate Change and Land: an IPCC special report on climate change, desertification, land degradation, sustainable land management, food security, and greenhouse gas fluxes in terrestrial ecosystems, 2019 Intergovernmental Panel on Climate Change (2019) (www.ipcc.ch).

Spector, N. A., B. F. Dodge, Removal of carbon dioxide from atmospheric air, Trans. Am. Inst. Chem. Engrs., 42,827-48 (1946)

The invention claimed is:

1. A catalytic reactor for the production of syngas from mixtures of hydrogen and carbon dioxide to syngas comprising:
   a. an inlet nozzle;
   b. an outer shell of metal with a thickness between ¼ inches and 10 inches;
   c. a refractory layer that has a thickness of between 6 and 18 inches where the refractory layer comprises an insulating material:
   d. an inner sleeve that has a surface that is made from at least one high-temperature alloy where the high temperature alloy comprises nickel and chromium where the nickel is between 29 and 75 wt % of the alloy and the chromium is between 13 and 32 wt % of the alloy;
   e. a catalyst bed capable of converting mixtures of carbon dioxide and hydrogen to carbon monoxide; and steam, where the catalyst bed comprises multiple catalyst sections separated by at least one high temperature alloy sheath and wherein the number of catalyst sections is from 2 to 100, and where the catalyst bed is penetrated by resistive heating elements:
   f. one or more resistive electrical heating elements;
   g. and an outlet nozzle.

2. The catalytic reactor of claim 1 wherein a high-temperature alloy sheath penetrates the outer shell and the sheath houses one of the resistive electrical heating elements.

3. The catalytic reactor of claim 2 in which the catalyst bed is horizontally penetrated by resistive electrical heating elements.

4. The catalytic reactor of claim 2 in which the catalyst bed is vertically penetrated by resistive electrical heating elements.

5. The catalytic reactor of claim 1 where the refractory layer comprises one or more layers of alumina, calcium aluminate, magnesium aluminate, silicon carbide, or silicon nitride.

6. The catalytic reactor of claim 1 where the surface of the inner sleeve has been treated with passivation to decrease its chemical potential for green rot and metal dusting to create a passivation layer.

7. The catalytic reactor of claim 6 wherein the passivation layer comprises a metal oxide chosen from the group comprising iron oxide, or nickel oxide, or chromium oxide, or cobalt oxide, or molybdenum oxide, or tungsten oxide, or copper oxide, or niobium oxide, or calcium oxide, or magnesium oxide, or alumina, or titania.

8. The catalytic reactor of claim 3 wherein multiple sheaths housing resistive electrical heating elements penetrate the outer shell around its perimeter at each heating section, terminating in the center of the reactor, wherein the number of heating elements per section may vary from 2 to 10.

\* \* \* \* \*